(12) United States Patent
Bataille et al.

(10) Patent No.: US 6,301,720 B1
(45) Date of Patent: Oct. 16, 2001

(54) MODULAR HELMET

(75) Inventors: Alexandre Bataille, Bordeaux; Daniel Laret, St Medard en Jalles; Catherine Dupin, Talence, all of (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/786,745

(22) PCT Filed: Jul. 7, 2000

(86) PCT No.: PCT/FR00/01976

§ 371 Date: Mar. 9, 2001

§ 102(e) Date: Mar. 9, 2001

(87) PCT Pub. No.: WO01/03534

PCT Pub. Date: Jan. 18, 2001

(30) Foreign Application Priority Data

Jul. 13, 1999 (FR) .................................................. 99 09097

(51) Int. Cl.⁷ ....................................................... A42B 1/24
(52) U.S. Cl. ....................................................... 2/422; 2/6.2
(58) Field of Search ................................. 2/410, 422, 6.1, 2/6.2, 6.3, 6.6

(56) References Cited

U.S. PATENT DOCUMENTS

| 1,231,766 | * | 7/1917 | Mahan . |
| 3,148,376 | * | 9/1964 | Aileo . |
| 5,623,730 | * | 4/1997 | Baudou et al. . |
| 5,742,937 | * | 4/1998 | Baudou et al. . |

* cited by examiner

*Primary Examiner*—Rodney M. Lindsey
(74) *Attorney, Agent, or Firm*—Oblon, Spivak, McClelland, Maier & Neustadt, P.C.

(57) ABSTRACT

A simplified-fitting modular helmet resistant to aerodynamic stresses. The helmet has a base helmet and module, and includes between these two parts two lateral linking devices and an upper linking device. The linking devices include a finger secured to the module inserted into a socket secured to the base helmet and latchable in the assembled position of the helmet by a device of the quarter of a revolution type. The lateral fingers permit a small lateral clearance between the two parts of the helmet. Such a helmet may find particular application as an aircraft pilot helmet.

6 Claims, 7 Drawing Sheets

MODULAR HELMET

Figure 1:
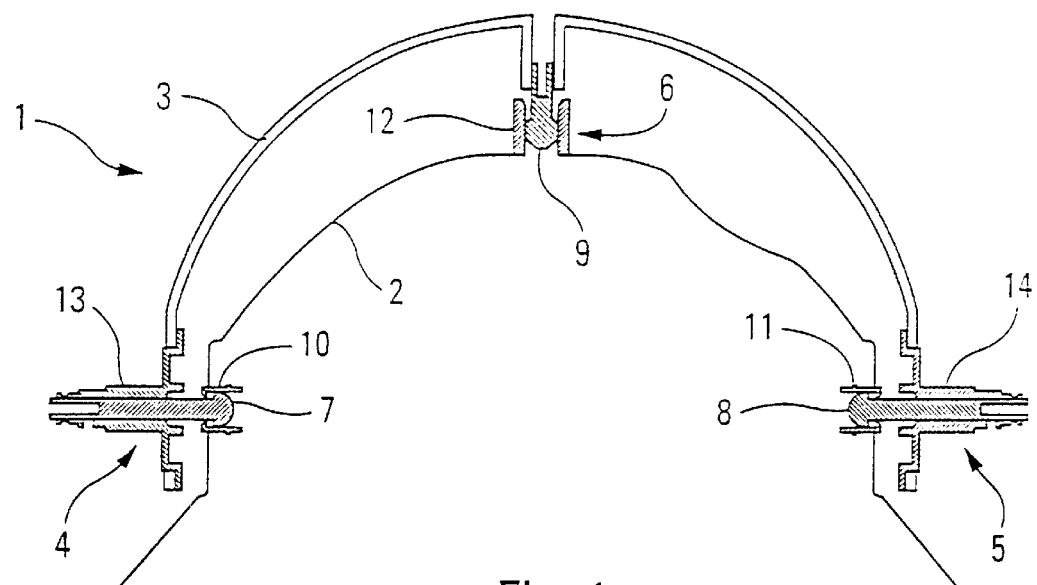

The present invention relates to a simplified-fitting modular helmet resistant to aerodynamic stresses, and in particular to a helmet intended for the pilots of warplanes.

The terminology "modular" signifies here that the helmet is of the type having two main subassemblies, namely a "base helmet" ensuring the physiological protection of the user, and a "module", overlying the base helmet and ensuring several functions detailed hereinbelow.

The "base helmet" part ensures the following functions: retention of the helmet (with the aid of a chinstrap for example), support for the audio equipment of the helmet, protection against knocks and against perforation, support for the "module", protection against fire, support for the oxygen mask, etc.

The module part supports, among other things, apparatus ensuring the following functions: information presentation function (night vision goggles, helmet viewfinder, etc.), function of gages (for example electromagnetic sensor of head orientation, camera for restoring visual environment, etc.), miscellaneous functions (visor, hooding, etc.).

The advantage of a modular design such as this is that it is possible to use the base helmet (which can be customized) as a platform for fitting various modules as a function of the types of missions accomplished by the user (day flight, night flight, reconnaissance, combat, etc.). On the other hand, the difficulties related to the use of this type of helmet on a fighter aircraft stem from the compromises to be made. Specifically, it is necessary to be able:

to accurately position the module with respect to the head of the user so that the visual information is presented to him in such a way as to coincide with his visual axis;

to isolate the module (which is rigid for accuracy and stability reasons) from the base helmet (which is flexible, so as to be able to be easily donned by the user and so as not to impede him);

to preserve the integrity of the helmet during a high speed ejection (up to 625 KEAS). This requirement is constraining, since the helmet viewfinders are characterized by visor positions which are very far forward and which increase the aerodynamic loads upon ejection;

to ensure ready modularity at the place of use, without any element which may be lost, and which may be manipulated without tooling;

to obtain the lowest possible total mass. The known solutions do not fulfill all these conditions. Specifically, these solutions, which may be classed into two groups, consist essentially:

either in strengthening the resistance of the module by adding material to it, or in fixing the module on the base helmet by conventional screwing. These known solutions exhibit the following drawbacks:

the first makes the helmet very heavy and off-centered toward the front, and does not guarantee that the module will remain secured to the base helmet which may deform under the effect of the "wind blast" when the user ejects, the second does not fulfill the requirements of isolation of the two parts of the helmet and of non-use of tooling.

The subject of the present invention is a helmet of the aforesaid type which fulfills all the conditions set forth hereinabove and whose cost price is no higher than that of known helmets.

The helmet in accordance with the invention, of the type with base helmet and module, comprises three linking devices between the base helmet and the module, these linking devices taking the form of fingers secured to the module and engaging in corresponding sockets of the base helmet, two of these linking devices being disposed laterally and ensuring a link with a longitudinal clearance and one being disposed near the apex of the helmet and ensuring a translationally fixed link.

Figure 2:
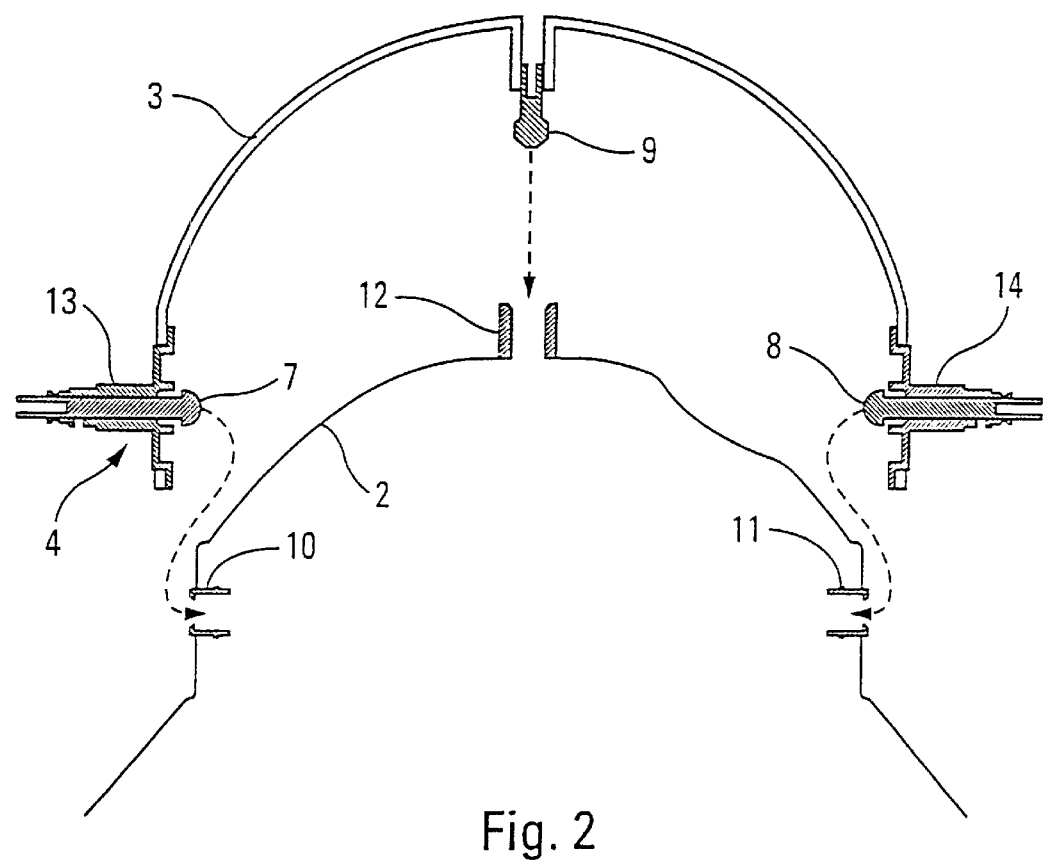
Figure 3:
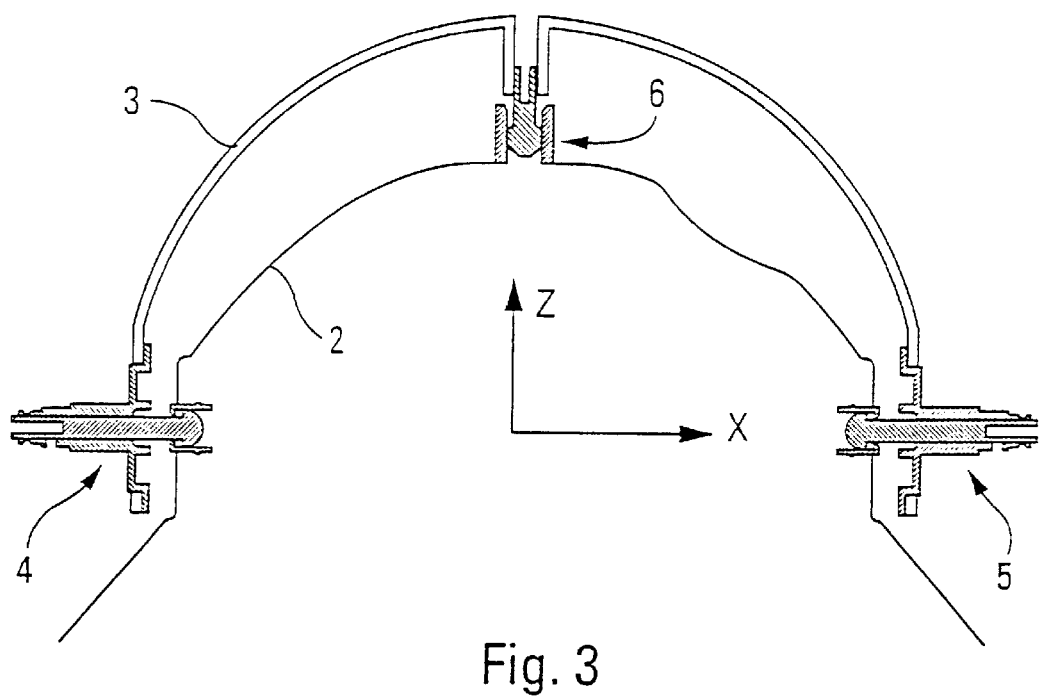
Figure 4:
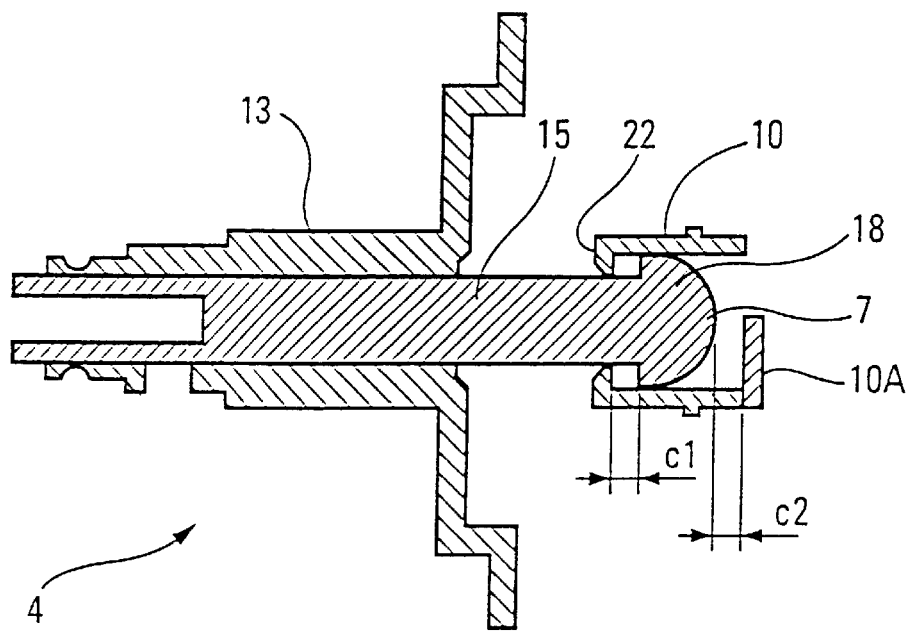
Figure 5:
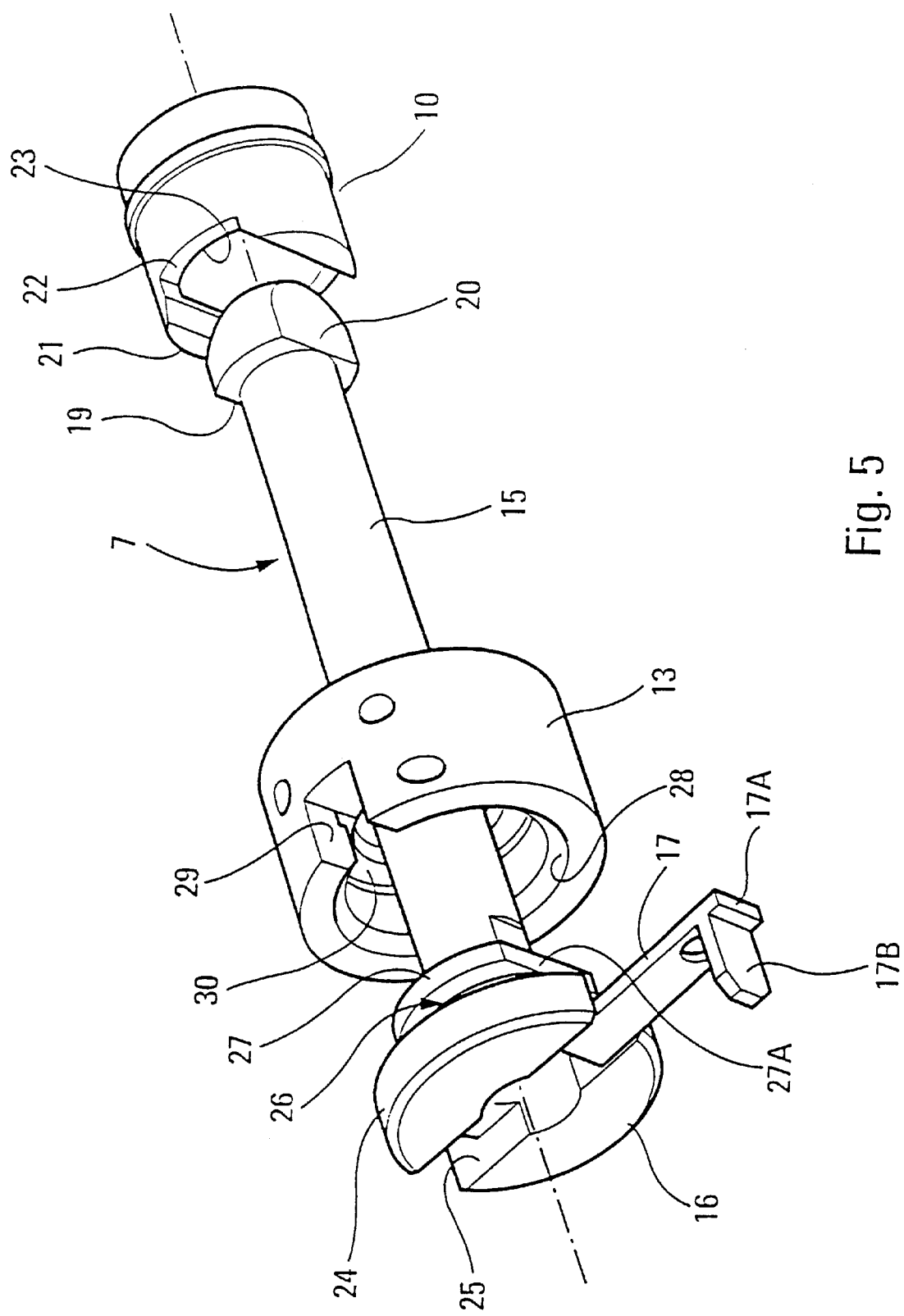
Figure 6:
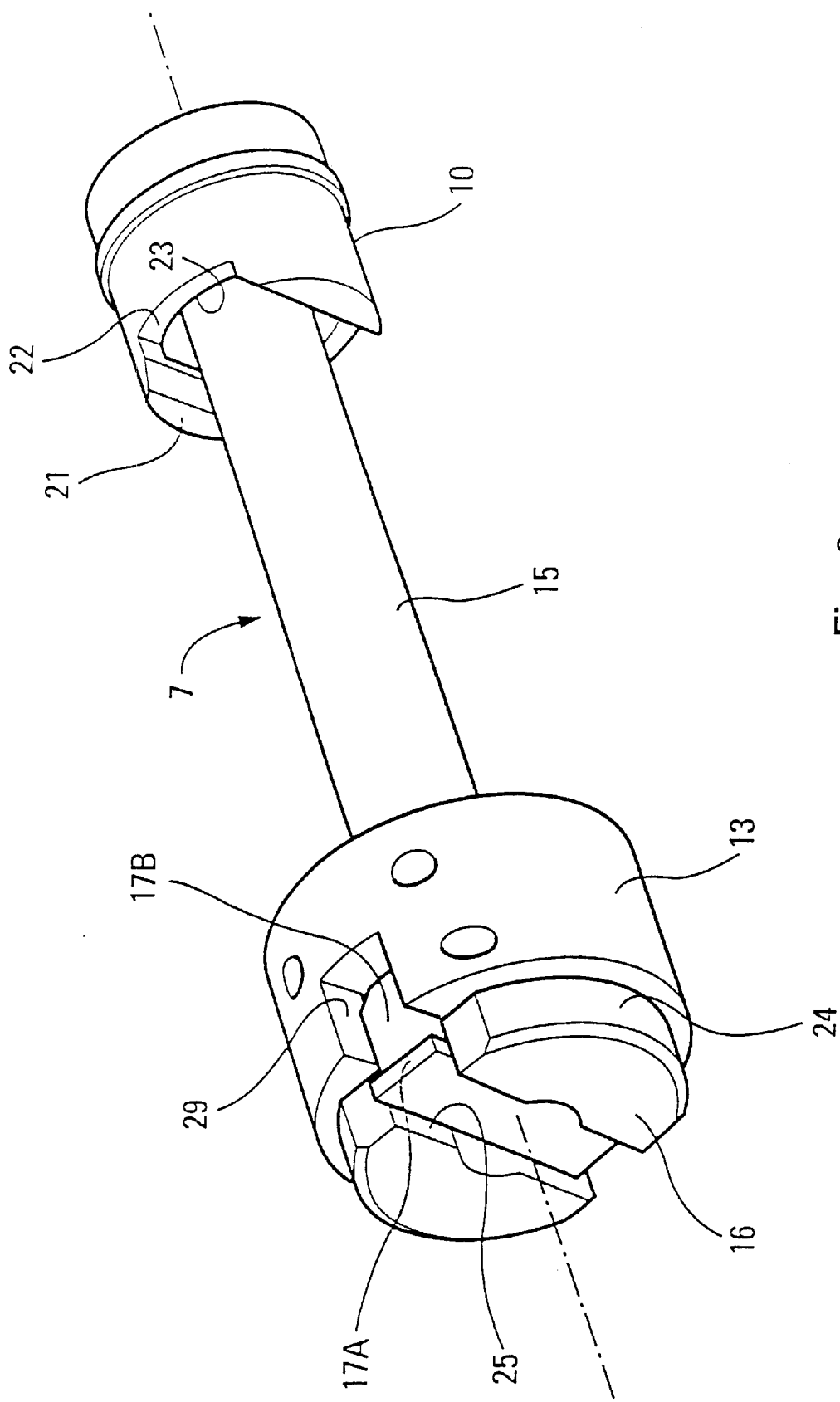
Figure 7:
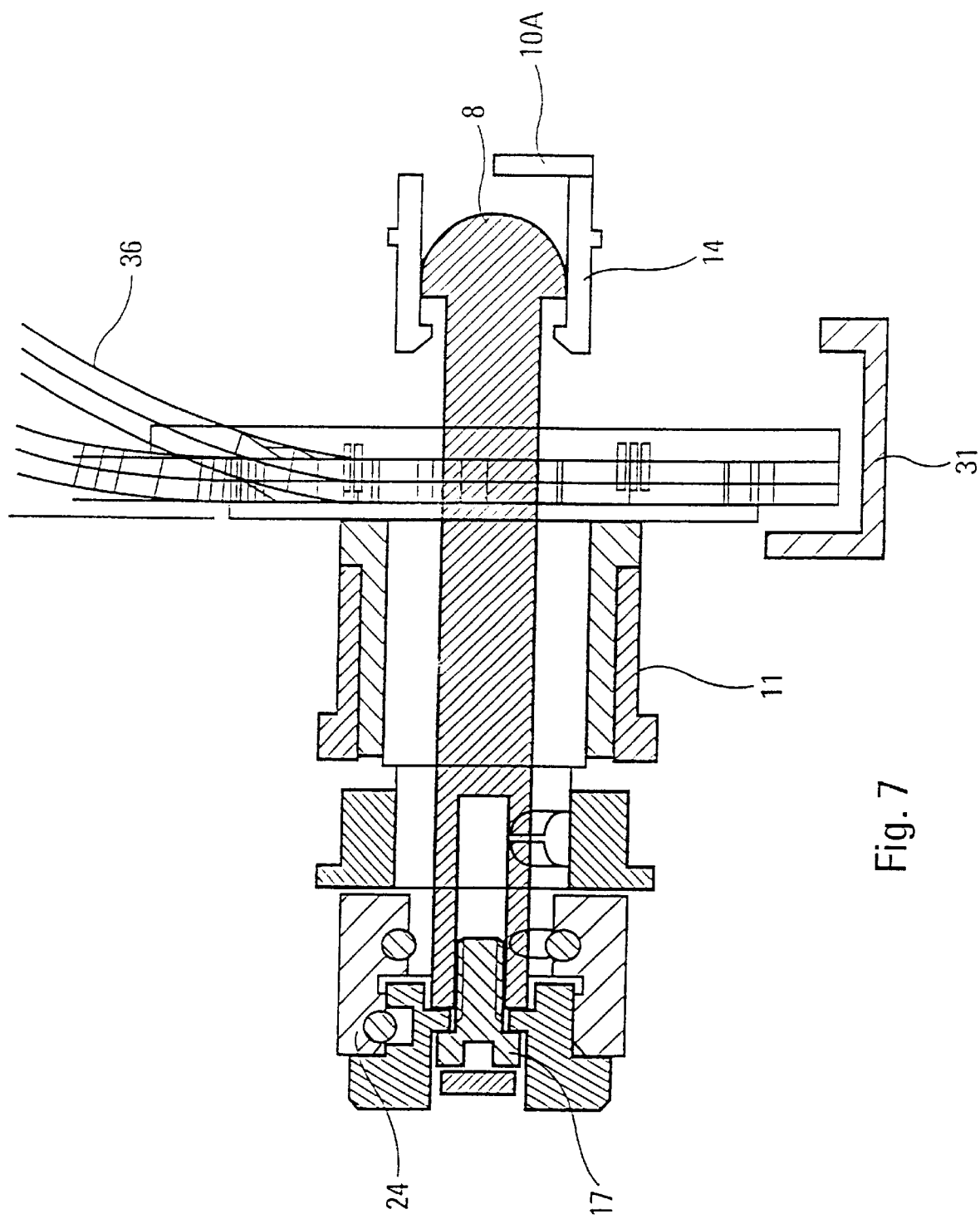
Figure 8:
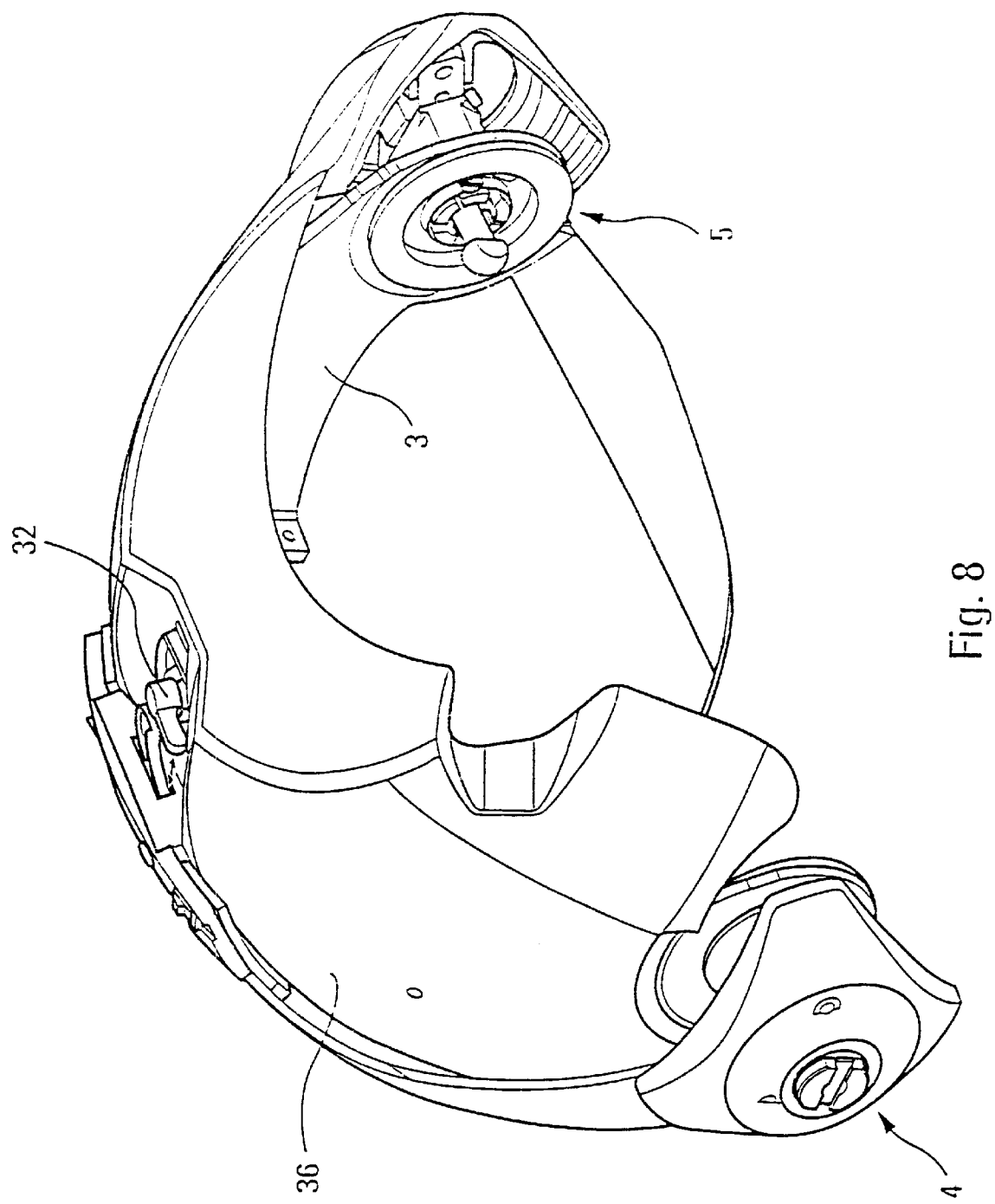
Figure 9:
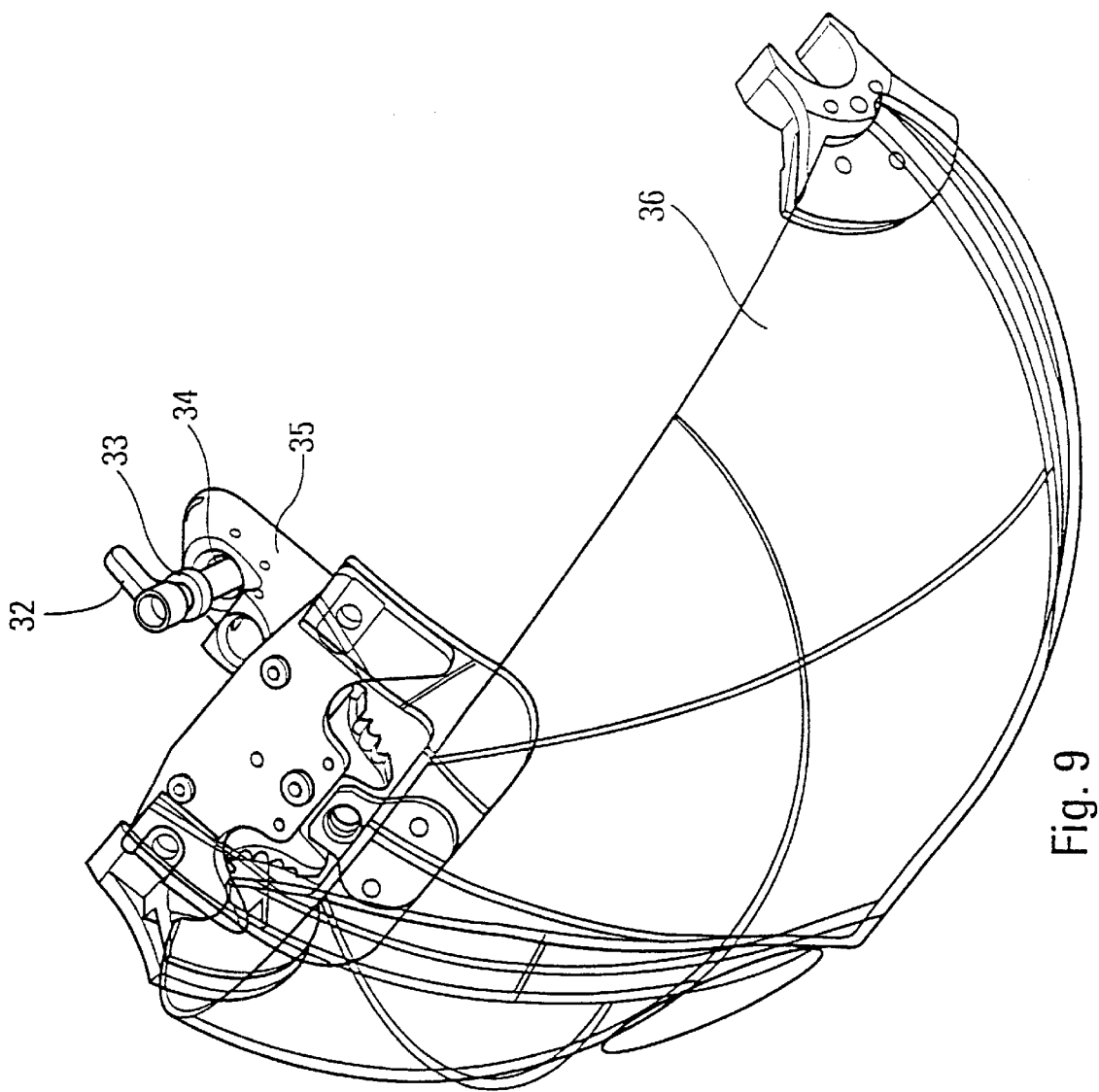

The present invention will be better understood on reading the detailed description of an embodiment, taken by way of nonlimiting example and illustrated by the appended drawing, in which:

FIG. 1 is a simplified sectional view of a helmet assembled in accordance with the invention, FIG. 2 is a simplified sectional view of the helmet of FIG. 1, the module being separated from the base helmet, FIG. 3 is the same view as that of FIG. 1 illustrating a degree of freedom of the module with respect to the base helmet, FIG. 4 is a partial sectional view of one of the linking devices between the module and the base helmet according to the invention, FIGS. 5 and 6 are perspective views of the linking device of FIG. 4, respectively in the disassembled state and in the assembled state, FIG. 7 is a sectional view of the linking device of FIG. 4, but represented in a more complete manner, and FIGS. 8 and 9 are perspective views according to two different viewpoints of the module of the helmet of the invention showing, in particular, the upper linking device respectively in the unlatched position and in the latched position.

Only the elements of the helmet which are necessary for an understanding of the invention have been represented in the various figures of the drawing. Thus, for better legibility of these figures, neither elements such as the optical and optoelectronic apparatus (night vision goggles, viewfinder, etc.) fixed to the module, nor the various elements which may be fixed to the base helmet (chinstrap, audio equipment, oxygen mask, etc.) have been represented.

As represented in a very simplified manner in FIGS. 1 to 3, the helmet 1 in accordance with the invention essentially comprises a base helmet 2 in contact with the head of the user and a module 3 surrounding the base helmet some distance from it and fixed to it with the aid of three linking devices 4 to 6 which are secured to the module 3 and can be easily assembled and disassembled relative to the base helmet 2. The linking devices 4 and 5 are disposed laterally, at the level of the axis of articulation of the visors of the helmet (clear visor and tinted visor), have their axes concurrent and can be retracted outward. The linking device 6 is disposed at the apex of the helmet (or near this apex). The linking devices 4 to 6, described in greater detail hereinbelow with reference to FIGS. 4 to 6, take the form of fingers 7 to 9 engaging in bores of sockets 10 to 12 respectively, forming part of the base helmet 2. The fingers 7 and 8 can move in support mountings 13, 14 fixed to the module 3, and can be latched in these mountings and in the sockets 10 and 11 when the module 3 is in place on the base helmet, while nevertheless allowing a lateral clearance necessary for the deformation of the base helmet relative to the module, as described hereinbelow with reference to FIG. 4. The module is fitted onto the base helmet simply by introducing the finger 9 into the bore of the socket 12, the fingers 7 and 8 being retracted. Next, the module is correctly positioned relative to the base helmet, in particular so that the fingers 7 and 8 are facing the bores of the sockets 10 and 11, and these fingers are inserted while they are being latched in the inserted position in the manner described hereinbelow.

As may be seen according to FIGS. 3 and 4, when the module 3 is assembled with the base helmet 2, and when the fingers 7 and 8 are latched in the inserted position, a clearance remains between the module and the base helmet, this allowing a slight relative movement between them in the direction marked "x" (direction parallel to the axis of rotation of the visors), this ensuring the sought-after relative independence of these two parts of the helmet when they are assembled. Conversely, the finger 9 is translationally locked (as described hereinbelow with reference to FIGS. 8 and 9), but can perform a slight rotation relative to the base helmet, about its axis.

However, such a characteristic does not guarantee the resistance of the helmet to "wind blast" (relative wind when the user ejects from his aircraft). Specifically, with the linking devices hereinabove, the module, which is subjected to the major part of the aerodynamic loads (in particular on account of the visors, which have a relatively large surface area), alone supports most of the loadings related to the relative wind during ejection. The principal behavior of the module is then a lateral deformation and the module is subjected to a lifting load tending to tear it off upward. According to the invention, so as not to increase the mass of the module, these loads are transferred to the base helmet (which is held on the head of the user by the chinstrap) so as to relieve this module. This is achieved by virtue of the fact that at the end of a short lateral travel in one or the opposite direction of the module, one of the fingers 7 or 8 comes into abutment on the socket 10 or 11, as illustrated in a simplified manner in FIG. 4. Represented in this FIG. 4 is one of the lateral devices for linking between module and base helmet, for example the device 4. Represented in this FIG. 4 is the socket 10 fixed to the base helmet 2, the mounting 13 fixed to the module 3 and the linking finger 7 (without its maneuvering knob, which is represented in the subsequent figures).

The finger 7 has a body 15 in the form of a cylindrical rod which can move in rotation and in translation in the mounting 13. That end of the body 15 which is directed toward the outside of the module is slotted so as to make it possible to fix therein (see FIG. 7) the support bed 16 of the maneuvering knob 17 represented in FIGS. 5 and 6. The other end of the body 15 terminates in a head 18 of substantially hemispherical shape, with a diameter greater than that of the body 15. Two mutually parallel flats 19, 20 are made on the surface of the hemisphere and the distance between these flats is slightly greater than the diameter of the body 15. The head 18 is intended to be introduced into the socket 10 and to be latched therein. Accordingly, the socket 10, which has an annular general shape, has an anterior part 21 (that facing the mounting 13) exhibiting an opening with an oblong-shaped cross section complementary to that of the cross section of the head 18 (opening having a cross section with two parallel sides with separation equal to that of the flats 19, 20 and terminating in arcs of a circle). The bottom of the anterior part 21 consists of a transverse wall 22 drilled with an opening 23 whose cross section has a shape complementary to that of the cross section of the head 18. The body of the socket 10, to the rear of the wall 22, is bored to a diameter substantially equal to the diameter of the head 18 before the formation of the flats.

Thus, to latch the finger 7 in the socket 10, the head 18 is introduced into the opening of the part 21 while aligning the flats 19, 20 with the plane sides of the opening of the part 21, then inserting the head 18 into the socket, and when the head 18 has negotiated the wall 22, it is made to rotate by a quarter of a revolution. The head 18 can then no longer be withdrawn from the socket 10 unless it is again made to rotate by a quarter of a revolution. As specified hereinabove, in order to allow the module a slight lateral play, there is provided a clearance of length C1 of around 1 mm between the anterior edge of the head 18 and the posterior edge of the wall 22 of the socket 10 (see FIG. 4) and a clearance C2 (of around 4 to 5 mm) between the apex of the head 18 and an abutment 10A fixed in the bottom of the socket 10, and likewise for the linking device 5, when the module is fixed in place on the base helmet. The length of the finger 7 and its travel are determined so as to make it possible to obtain the clearances of lengths C1 and C2. These lateral play clearances allow the module to come very rapidly into contact with the abutments of the helmet in the case of "wind blast", and allow the user to "don" his helmet more easily on his head (the base helmet being flexible). This lateral play clearance allows a greater clearance, through a lever effect, at the level of the headphones of the helmet (several cm), which are much lower than the axis of the fingers 7 and 8.

The mounting 13, the bed 16 and the knob 17 are made in the manner represented in FIGS. 5 and 6 in particular, so as to maneuver the finger 7 and to lock its head in the latched position in the socket 10. The bed 16 has a frustoconical general shape exhibiting, in succession along its axis, three different diameters. At its free end 24 (that which is directed toward the outside of the helmet), the bed 16 exhibits its largest diameter. A diametral channel 25 is made in the front face of the end 24, and it acts as housing for the knob 17 which is articulated therein. In the maneuvering position of the finger 7 (FIG. 5), the knob 17 is folded down out of the channel 25 which it extends radially outward from the bed. In the folded-up position (FIG. 6), the knob 17 is housed in the channel 25. Only the free end 17A of this knob then overhangs radially from this channel, so as to enable it to be taken out of this channel. The knob 17 comprises a maneuvering tab 17B running perpendicularly to the body of the knob near to the end 17A. The central cross section of the bed 16 is that having the smallest diameter, and its other end 27 has a diameter intermediate between those of the other two parts of the bed. Two mutually parallel flats with one diameter are made on this end 27 (only one of these two flats, referenced 27A, is visible in FIG. 5).

Internally, the mounting 13, of annular general shape, comprises a dish 28 whose inside diameter is equal to the outside diameter of the part 24 of the bed 16 and whose depth is slightly less than the axial length of the part 24. A locating notch 29 serving as housing for the tab 17B of the knob 17 when the latter is folded up and when the head 18 is latched in the socket 10 is made in the lateral wall of the dish 28. The wall 30 of the bottom of the dish 28 is drilled with an opening whose cross section has a shape complementary to that of the part 27 of the bed 16. The straight parts of the shape of this opening are oriented angularly in such a way that when the part 27 enters this opening, the flats 19 and 20 of the head 18 are parallel to the parallel sides of the opening 23 of the socket 10, and that the head 18 can therefore be introduced into the socket 10. The thickness of the wall 30 is equal to the axial length of the groove 26 of the bed 16. The length of the body of the finger 7 is such that when the part 24 of the bed 16 is in abutment against the wall 30, the head 18 is completely engaged behind the wall 22. To lock the finger 7, it is then sufficient to rotate it, with the aid of the knob 17, by a quarter of a revolution (in the clockwise direction in the case of the initial position of introduction of FIG. 5). After this rotation, the part 27 of the bed 16 is latched in longitudinal translation by the wall 30, and the head 18 is latched in longitudinal translation by the wall 22 while the knob 17 can be folded up into the channel 25 and its tab 17B is housed in the notch 29, rotationally immobilizing the finger 7. Of course, the knob 17 is furnished with appropriate means (for example a spring leaf) which hold it in the folded-up position, and which do not permit it to be folded down other than by the user when he pulls its end 17A.

According to an advantageous characteristic of the invention and illustrated in FIG. 7, abutments are fixed to the base helmet, near the ends of the module and of the visors, at the level of the fingers 7 and 8. Only the abutment 31 relating to the finger 8 has been represented. These abutments are in the shape of a stirrup with a "U" cross section. The abutment 31 is a device complementary to the abutment on the socket 14 (see FIG. 7). Specifically, once the finger 8 has come into abutment on the socket 14, the entire module can deform (under the effect of the relative wind during ejection) and hence give rise to moments on the finger 8. Since the finger 8 is hemispherical, it does not adopt the rotations and hence the rotational moments about the center of the sphere. This is why provision has been made for a second abutment with an offset axis which makes it possible to limit this rotation. The abutment 31 is secured to the base helmet and is nonremovable. The module is fitted by firstly plugging in the central finger 9. Next, the module is tilted backwards and the lateral mechanisms lodge behind the abutment 31. Next, the fingers 7 and 8 are inserted. These abutments 31 are set in place automatically without impeding the fitting of the module onto the base helmet.

Represented in FIGS. 8 and 9 is the control lever 32 of the upper finger 9. A disk 33 comprising two mutually parallel peripheral flats is formed on the finger 9, under the lever 32. This disk 33 passes into an opening 34 of corresponding shape made in the support 35 of the finger 9 (support fixed on the module 3) when this finger is correctly oriented angularly and is inserted. When the finger 9 is in place, it is rotated by a quarter of a revolution with the aid of the lever 32, and the disk 33 becomes locked under the opening 34, in a similar manner to the latching of the fingers 7 and 8. Of course, means (not represented) are provided for rotationally immobilizing the finger 9, which means cannot be unlocked other than by the user, so as to prevent any accidental unlatching of the finger 9.

In the unlatched position of the finger 9, its lever 32 prevents the visor from being raised (FIG. 8), it being possible to raise this visor only when the finger 9 is latched (FIG. 9), thereby constituting a safety device which signals to the user that the module is not properly assembled to the base helmet. This safety device is supplemented by the visual indication afforded by the knobs 17 of the fingers 7 and 8: these knobs can only be folded up and stowed in the channels 25 if the fingers 7 and 8 are correctly latched in the sockets 10, 11.

As represented in particular in FIGS. 7 and 8, the axis of articulation of the visors can be concurrent with the common axis of the fingers 7 and 8, thereby rendering the device of the invention compact. This makes it possible to transfer the aerodynamic loads applied to the visors during ejection to the base helmet by way of the fingers 7 and 8 without any mismatch, and hence to reduce the overall mass of the helmet.

What is claimed is:

1. A simplified-fitting modular helmet, having a flexible base helmet for being fixed on the head of the user and a rigid module overlying the base helmet, comprising three linking devices between the base helmet and the module, these linking devices taking the form of fingers secured to the module and engaging in corresponding sockets fixed to the base helmet, two of these linking devices being disposed laterally, and another being disposed near the apex of the helmet, characterized in that the three linking devices comprise a device for translational locking with respect to the rigid module, of the quarter of a revolution type, that the two lateral linking devices effect a link with longitudinal clearance, and that the third effects a translationally fixed link.

2. The helmet as claimed in claim 1, characterized in that the longitudinal clearance is around 1 mm in one direction and around 4 to 5 mm in the opposite direction.

3. The helmet as claimed in claim 1, characterized in that the ends of the lateral fingers comprise a device for translational locking of the quarter of a revolution type.

4. The helmet as claimed in claim 1, characterized in that in the unlatched position the upper finger completely prevents visors of the helmet from being raised.

5. The helmet as claimed in claim 1, characterized in that in the latched position the fingers are rotationally immobilized.

6. The helmet as claimed in claim 1, characterized in that it comprises two lateral fingers whose axes are concurrent with those of visors.

* * * * *